United States Patent [19]
Scoggin

[11] 3,800,845
[45] Apr. 2, 1974

[54] SOLVENT REMOVAL FROM POLY(ARYLENE SULFIDE) REACTION SLURRY

[75] Inventor: Jack S. Scoggin, Bartlesville, Okla.

[73] Assignee: Phillips Petroleum Company, Bartlesville, Okla.

[22] Filed: Dec. 14, 1971

[21] Appl. No.: 207,798

[52] U.S. Cl.............. 159/47, 203/88, 260/79.1, 159/2, 203/73
[51] Int. Cl........................ B01d 3/06, C08g 23/00
[58] Field of Search............ 203/88, 71, 73, 80, 91; 152/2 R, 2 MS, 47; 260/79, 79.1

[56] References Cited
UNITED STATES PATENTS

| | | | |
|---|---|---|---|
| 3,478,000 | 11/1969 | Saunders | 260/79 |
| 3,544,540 | 12/1970 | Housers | 260/94.9 F |
| 3,707,528 | 12/1972 | Miles | 260/79 |
| 3,280,091 | 10/1966 | Dance | 203/80 |
| 3,668,161 | 6/1972 | Nauman | 159/2 MS |
| 3,453,182 | 7/1969 | Reber | 203/88 |
| 3,423,386 | 1/1969 | Folz | 203/88 |
| 3,410,761 | 11/1968 | Slattery | 203/88 |
| 3,201,365 | 8/1965 | Charlesworth | 159/2 R |

Primary Examiner—Norman Yudkoff
Assistant Examiner—Hiram H. Bernstein

[57] ABSTRACT

A method is provided for the removal of polar organic diluent from a reaction slurry of poly(arylene sulfide) solid polymer particles, organic polar diluent, by-product alkali metal halide, and other impurities by the isothermal evaporation of the reaction slurry reducing the pressure on the slurry from reaction pressure sufficiently to evaporate essentially all of the water and approximately one third of the diluent and then removing the concentrated reaction slurry to another vessel flashing the mixture adiabatically to atmospheric pressure to remove essentially all the diluent from the polymer.

5 Claims, 1 Drawing Figure

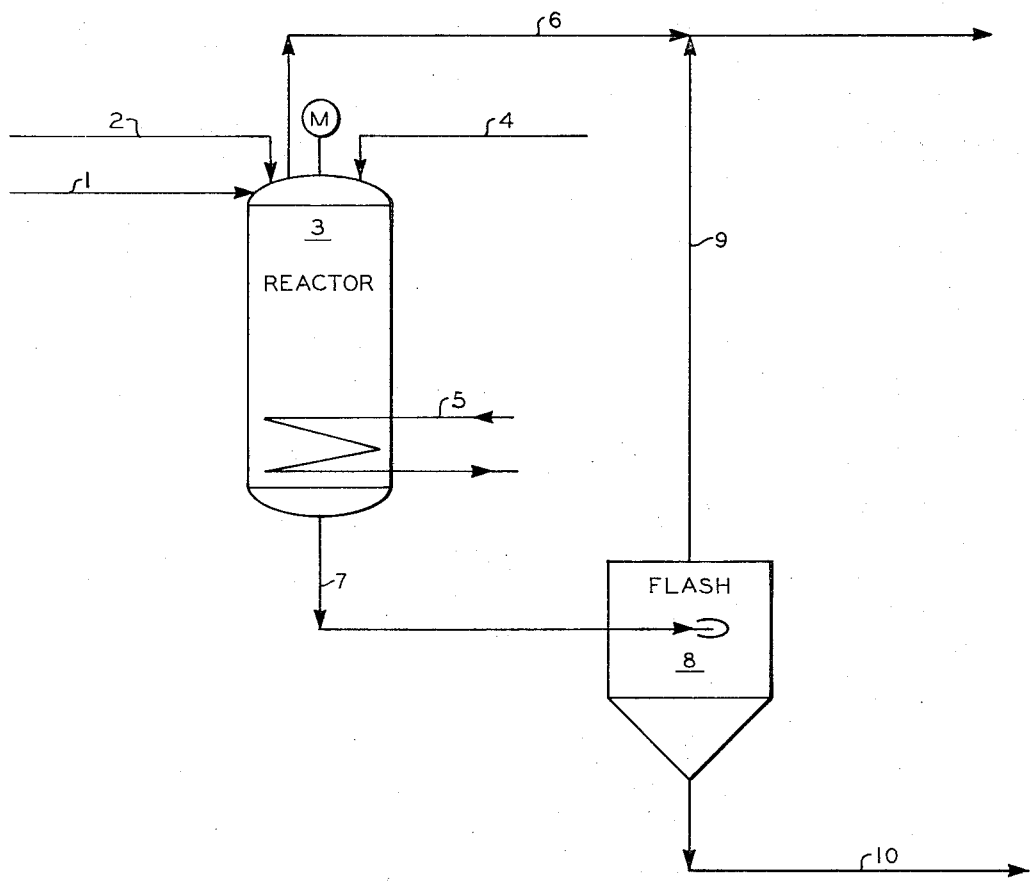

SOLVENT REMOVAL FROM POLY(ARYLENE SULFIDE) REACTION SLURRY

BACKGROUND OF THE INVENTION

This invention relates to the removal of diluent from poly(arylene sulfide) reaction slurries. In one of its aspects, it relates to the evaporation of diluents from reaction slurries. In another aspect of the invention it relates to the recovery of poly(arylene sulfide) from its reaction slurry.

In one of its concepts the invention relates to the removal of diluent from a poly(arylene sulfide) reaction slurry using a two stage evaporation process. In another of its concepts the invention relates to the separation of a poly(arylene sulfide) compound from its reaction slurry by evaporation of the diluent from the mixture prior to filtering in order to obtain a more readily processable particulate polymer.

A poly(arylene sulfide) must be relatively free of metal halide salts and other ash producing contaminants to be of full usefulness and value. A major problem in the production of poly(arylene sulfide) has been the recovery of high purity polymer from the contaminants in its reaction slurry. It was discovered early in the commercial production of poly(arylene sulfide) that the polar diluents usually used in polymerization processes caused difficulty in separating the polymer from its slurry by such usual means as filtration in that the diluent and polymer produce a filter cake of such "pasty" physical characteristics that plugging of the filter is a continuous problem and washing the filter cake free of other contaminants is impossible. To avoid these problems, methods have been proposed for removal of the diluent from the polymer before separation of the polymer and other contaminants is attempted. Methods of vacuum evaporation of the diluent have proved successful in separating the diluent and polymer to produce a slurry filter cake that can be reslurried and filtered to remove metal halide salts and other contaminants.

I have now discovered that a two stage evaporation of a poly(arylene sulfide) slurry first isothermally evaporating the slurry reducing the reaction pressure to evaporate essentially all the water and approximately one third of the polar diluent and then flashing the concentrate adiabatically into another vessel to atmospheric will remove essentially all of the polar diluent from the polymer slurry.

Accordingly, it is an object of this invention to provide a more economical method for removing polar organic solvent from a poly(arylene sulfide) reaction mixture. Another object of the invention is to provide a mechanically simple, economic, and efficient method for producing a poly(arylene sulfide) from its reaction slurry.

Other aspects, objects and advantages of this invention will be apparent to one skilled in the art upon studying the specification, drawing and the appended claims.

SUMMARY OF THE INVENTION

In accordance with the invention arylene sulfide polymerization reaction slurries containing poly(arylene sulfides), organic polar diluent, alkali metal halides and other impurities are subjected to isothermal evaporation by reducing the reaction pressure sufficiently to evaporate essentially all of the water and up to 50 percent of the polar diluent from the mixture, then flashing the concentrate adiabatically to atmospheric pressure to remove essentially all the polar diluent from the reaction slurry, recovering the polar diluent and water, separating the polar diluent from the water, and recovering the flashed polar organic diluent.

It is well known that the removal of the organic polar diluent from the poly(arylene sulfide) slurry prior to washing and removal of the washed solution results in the recovery of highly processable polymer particles with a high degree of purity. The removal of the polar organic diluent from the slurry can be affected in a two-step process by the isothermal evaporation of the reaction products in the polymer reactor itself as in the case of a batch reaction, or in a separate evaporation zone in the case of either a batch or a continuous reaction. It is presently preferred to carry out the isothermal evaporation in the reaction vessel. The reaction product concentrate produced by the isothermal evaporation can then be treated by adiabatic flashing to atmospheric pressure in the same vessel in which the isothermal evaporation was carried out or the concentrate can be flashed into another vessel. It is presently preferred to flash the concentrate into another vessel removed from the isothermal evaporation.

The process of this invention is useful with poly(arylene sulfides) generally, regardless of the method of preparation. However, the invention is especially useful with polymers prepared with the solution reaction of polyhalo compounds with metal sulfide as described in U.S. Pat. No. 3,354,129.

According to said patent poly(arylene sulfide) polymers can be prepared at high yield by reacting at least one polyhalo-substituted cyclic compound containing unsaturation between adjacent ring atoms and wherein the halogen atoms are attached to ring carbon atoms with an alkali metal sulfide in a polar organic diluent at an elevated temperature. Generally, the polar organic diluent will substantially dissolve both of the alkali metal sulfide and the polyhalo-substituted aromatic compound or other compound which can be present. The polymers produced by the process of said patent are ordinarily particulate materials and the properties of these materials will vary considerably depending upon the chosen reactants. Some are high melting thermoplastic materials having excellent high temperature stability, while others can be much lower in molecular weight, including liquids and grease-like materials. Melting point or softening point of these polymers can range all the way from liquids at 25° C. to polymers melting above 400° C.

The polyhalo-substituted compounds which can be employed as primary reactants according to said patent are represented by the formulas:

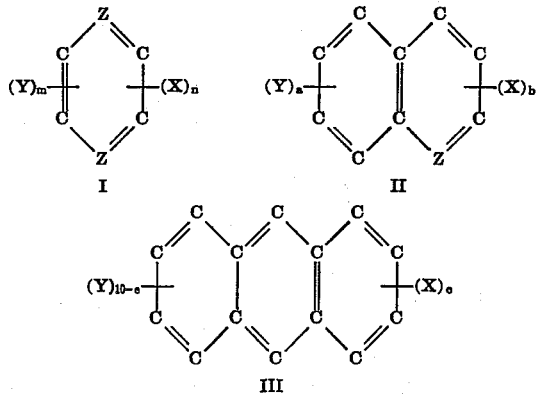

I  II

III

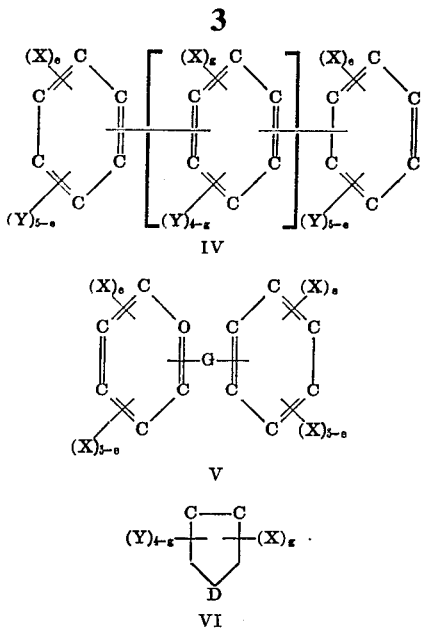

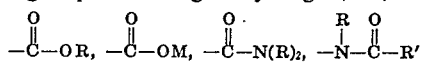

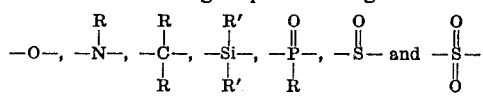

wherein each X is a halogen selected from the group consisting of chlorine, bromine, iodine, and fluorine, preferably chlorine and bromine, each Y is selected from the group consisting of hydrogen, -R, -N(R)$_2$, $$-\overset{O}{\underset{\|}{C}}-OR, \quad -\overset{O}{\underset{\|}{C}}-OM, \quad -\overset{O}{\underset{\|}{C}}-N(R)_2, \quad -\overset{R}{\underset{|}{N}}-\overset{O}{\underset{\|}{C}}-R'$$

-O-R', -S-R', -SO$_3$H, and -SO$_3$M, wherein each -R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms inclusive; each Z is selected from the group consisting of -N= and -C=; D is selected from the group consisting of -O-, -S-, and $$-\overset{R}{\underset{|}{N}}-$$

G is selected from the group consisting of $$-O-, \quad -\overset{R}{\underset{|}{N}}-, \quad -\overset{R}{\underset{\underset{R}{|}}{C}}-, \quad -\overset{R'}{\underset{\underset{R'}{|}}{Si}}-, \quad -\overset{O}{\underset{\underset{R}{\|}}{P}}-, \quad -\overset{O}{\underset{\|}{S}}- \text{ and } -\overset{O}{\underset{\underset{O}{\|}}{S}}-$$

M is an alkali metal selected from the group consisting of sodium, potassium, lithium, rubidium, and cesium; $n$ is a whole integer of from 2 to 6, inclusive; when both Z's in Formula I are -C=, $m=6-n$, when one Z in Formula I is -C=, $m=5-n$, when both Z's in Formula I are -N=, $m=4-n$; $b$ is a whole integer of from 2 to 8, inclusive, when Z in Formula II is -C=, $a=8-b$, when Z in formula II is -N=, $a=7-b$; $c$ is a whole integer of from 2 to 10, inclusive; $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said patent are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The polar organic compounds which are employed as reaction media in the process of said patent should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides and the like.

Some specific examples of polyhalo-substituted compounds of the above general formulas which can be employed in the process of said patent are:

1,2-dichlorobenzene 1,3-dichlorobenzene 1,4-dichlorobenzene 2,5-dichlorotoluene 1,4-dibromobenzene 1,4-diiodobenzene 1,4-difluorobenzene 2,5-dibromoaniline N,N-dimethyl-2,5-dibromoaniline 1,3,5-trichlorobenzene 1,2,4-trichlorobenzene 1,2,4,5-tetrabromobenzene hexachlorobenzene 1-n-butyl-2,5-dichlorobenzene, and the like.

The conditions employed in the evaporation zones can vary but the pressure in these zones will always be at or above atmospheric pressure. The temperature of the polymer slurry at the completion of the reaction will ordinarily range from about 450° F to about 850° F and more preferably will be within the range of 500° F to about 580° F. At the termination of the reaction the reactor pressure will be in the range of 175 to 325 psig preferably in the range of 275 to 325 psig. The reduction of pressure for the isothermal evaporation of the reaction products should be sufficient to evaporate about one third to one half of the polar organic diluent and all of the water from the reaction mixture. A pressure reduction of approximately 200 psig will accomplish this. Adiabatic expansion to essentially atmospheric pressure will accomplish removal of the remaining polar diluent from the concentrated polymer slurry produced by isothermal evaporation.

The operation of this invention can be best understood by reference to the drawing which shows a method for the removal of polar organic diluent from a poly(arylene sulfide) reaction slurry. In the drawing, the alkali metal sulfide and water are pumped through line 1 and the polyhalo-substituted compounds are pumped through line 2 into the reactor 3 reacted at conditions of of elevated temperature in the range of 500° to 850° F and elevated pressure in the range of 200 to 400 psia to produce along with the polar diluent introduced through line 4, a reaction slurry of poly(arylene sulfide), organic polar diluent, water, by-product alkali metal halide, and other impurities.

At the end of the reaction, isothermal evaporation is carried out in the same vessel supplying the necessary heat input through heating coil 5 and driving off water and polar diluent through line 6. After the evaporation of all of the water and up to about 50 percent of the polar diluent the concentrated polymer slurry is removed from the reactor 3 through line 7 to flash vessel 8 where the polymer concentrate is flashed adiabatically to approximately atmospheric pressure removing all of the remaining polar diluent through line 9. After removal of the polar diluent the polymer slurry consisting of poly(arylene sulfide) polymer, by-product alkali metal halide and other impurities is removed through line 10 to be further treated for recovery of the arylene sulfide polymer.

The polar organic diluent recovered through lines 6 and 9 is processed to remove water and other impurities and made ready for return to the reactor.

The following example illustrating the process of this invention is meant to be illustrative and not exclusive.

EXAMPLE I 122 pounds of DCB are reacted with 48 pounds of sodium sulfide in the presence of 330 pounds of N-methyl pyrrolidone (NMP) and 15 pounds of $H_2O$. Reaction is initiated at 400°–440° F and terminated at 500°–580° F. 90 pounds of polyphenylene sulfide and 96 pounds of NaCl are produced. At termination of reaction reactor pressure is 175–325 psig.

After reaction termination heat is supplied to the reactor and vapor is removed from the reactor vapor space at rates in the range of 0.3–1.5 moles/hour per square foot of vapor liquid interphase. Initial vapor composition is about 50 mol percent water. Vapor is continuously removed from the reactor until essentially all of the water is removed and as much as 230 pounds of NMP is removed. During evaporation, the reactor temperature is maintained at 475°–575° F. Pressure in the reactor will fall by about 200 psi during the concentration or evaporation cycle because of water removal from the reactor.

After concentration of the polymer to about 1 pound polymer/pound NMP, the polymer-salt-NMP mixture at 475°–575° F is allowed to flash adiabatically to essentially atmospheric pressure and about 400° F. In flashing adiabatically the polymer solution is removed from the reactor, through a control valve, into a vessel operated 1 psi above atmospheric pressure.

After the adiabatic flash, the polymer-salt mixture is a granular solid and normally contains less than 0.15 pound NMP/pound polyphenylene sulfide-salt mixture.

The above procedure has been demonstrated in pilot plant operation.

Reasonable variation and modification are possible within the scope of the foregoing disclosure, the drawing and appended claims to the invention the essence of which is that there has been provided a method for removing polar organic diluent from a poly(arylene sulfide) reaction slurry by isothermal evaporation of the slurry followed by adiabatic expansion to atmospheric pressure of the resulting polymer concentrate.

I claim:

1. A process for removing polar organic diluent from reaction slurries comprising poly(arylene sulfide), polar organic diluent, alkali halide, water, and impurities, the method comprises
   a. subjecting the reaction slurry to isothermal evaporation by adding the necessary heat for evaporation and allowing sufficient reduction of the pressure on the reaction slurry to evaporate essentially all of the water and up to 50 percent of the polar diluent from the slurry,
   b. adiabatically flashing the concentrated slurry, produced in step (a), to about atmospheric pressure thereby removing essentially all of the polar diluent from the reaction slurry, and
   c. separating and recovering poly(arylene sulfide), polar organic diluent, and water as separate products.

2. The process of claim 1 wherein the pressure reduction in the isothermal evaporation is approximately 200 psig.

3. The process of claim 1 wherein the adiabatic expansion is carried to atmospheric pressure.

4. The process of claim 1 wherein the polar organic diluent is n-methyl pyrrolidone.

5. The process of claim 1 wherein the poly(arylene sulfide)-alkali halide-impurity mixture remaining after the adiabatic flash contains less than 0.15 pounds polar organic diluent per pound of said mixture.

* * * * *